Feb. 8, 1955   P. PATZ ET AL   2,701,652
SILAGE UNLOADER

Filed May 29, 1953   2 Sheets-Sheet 1

Fig.1

INVENTORS
P. Patz
E. A. Graetz
BY
Lieber & Lieber
ATTORNEYS.

Feb. 8, 1955

P. PATZ ET AL 2,701,652

SILAGE UNLOADER

Filed May 29, 1953

INVENTORS
P. Patz
E. A. Graetz
BY
Lieber & Lieber
ATTORNEYS.

United States Patent Office 2,701,652
Patented Feb. 8, 1955

2,701,652

SILAGE UNLOADER

Paul Patz and Edward A. Graetz, Pound, Wis.

Application May 29, 1953, Serial No. 358,308

4 Claims. (Cl. 214—17)

The present invention relates generally to improvements in the art of farming, and relates more particularly to improvements in the construction and operation of devices for unloading silage from an enclosure such as a silo.

A primary object of the invention is to provide an improved silage unloader which is extremely simple, compact and durable in construction and which is moreover highly efficient and economical in operation.

A more specific object of our present invention is to provide an improved mechanical silo unloader which is comprised of relatively few parts which may be readily assembled with ordinary tools and which can easily be disassembled or dismantled for insertion into or removal from silos of usual construction.

Another specific object of this invention is to provide an improved unitary and self-contained motor driven silage unloader which is highly flexible in its adaptations and in which all parts are readily accessible for inspection, cleaning, replacement or repair.

Another specific object of the invention is to provide an improved silo unloader which is adapted to effectively loosen the upper surface of stored silage and readily remove such loose sliage with utmost uniformity from one side of the silo wall to the other side thereof and without injury to the silage.

Still another specific object of my present invention is to provide an improved silo unloader which comprises novel and highly effective silage loosening and scraping means for conducting the silage uniformly to the center of the silo and other novel and efficient means for transferring the silage from the center of the silo to the exterior thereof through a side opening in the silo wall.

An additional specific object of the present invention is to provide an improved unitary silage unloading device comprising relatively few moving parts adapted to be driven by a single power source in a novel manner and capable of being manufactured and sold in quantity at moderate cost.

These and other specific objects and advantages of the present invention will become apparent from the following detailed description.

A clear conception of the several features constituting our present invention, and of the mode of constructing and of utilizing silage unloaders embodying the improvements, may be had by referring to the drawings accompanying and forming a part of this specification wherein like reference characters designate the same or similar parts in the various views.

Fig. 1 is a fragmentary vertical section through the upper part of a loaded silo and showing a side view of the improved silage unloader positioned therein;

Figure 2:
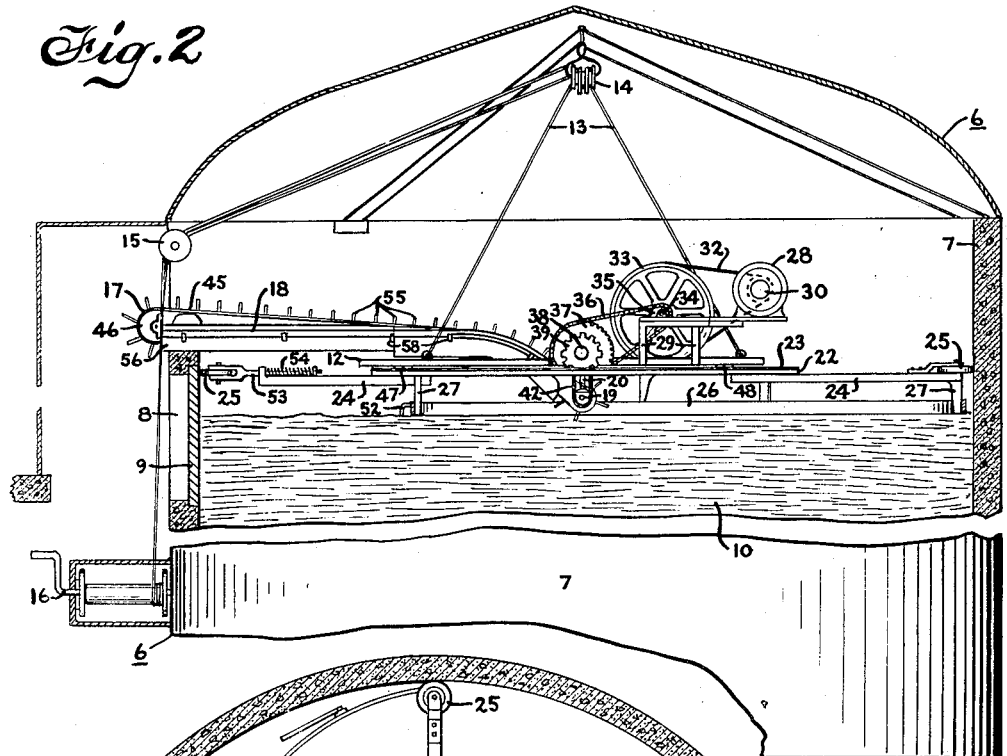
Fig. 2 is a somewhat reduced fragmentary part sectional view of a partially loaded silo, again showing one of our silage unloaders suspended therein in working position.
Figure 3:
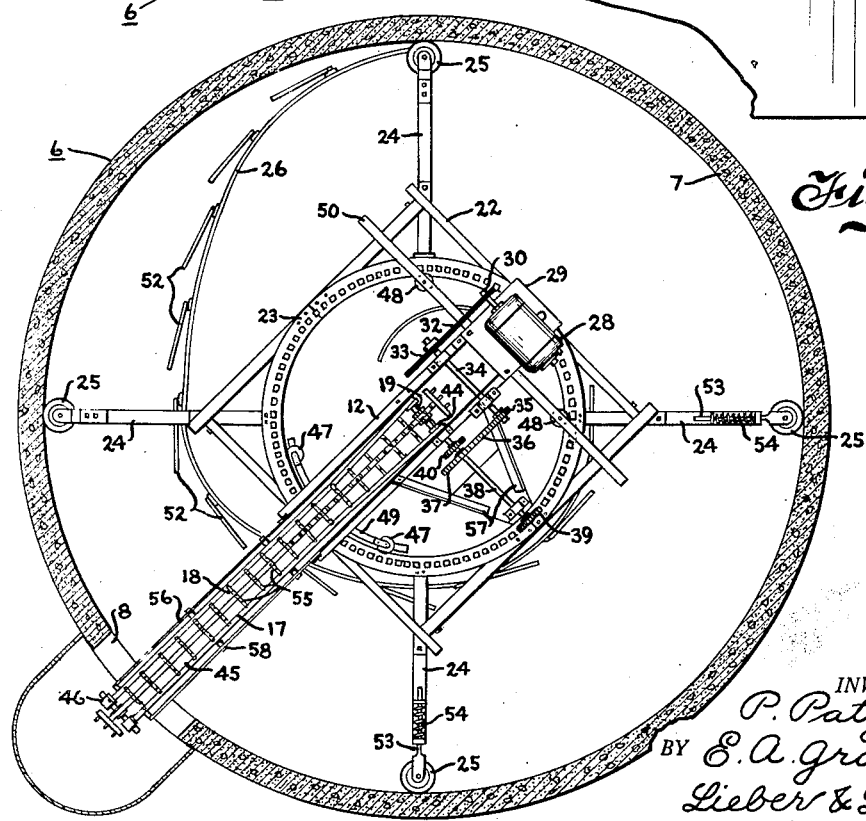
Fig. 3 is a similarly reduced horizontal section through the upper portion of the silo and showing a top view of the unloader positioned therein.

Referring to the drawings, the improved silage unloader is adapted for use in a silo 6 of more-or-less conventional construction and consisting of a circular side wall 7 having a relatively narrow discharge opening 8 normally extending vertically throughout the major height of the silo but being closed by a series of removable panels 9 adapted to retain the silage 10 to a desired level within the silo 6 but being readily removable to facilitate unloading of the silage therefrom.

The improved unloading device is adapted for positioning within the silo as shown and comprises, in general, a generally rectangular main frame 12 adapted to be suspended as by means of suitable cables 13 for vertical movement within the silo 6, the cables 13 extending upwardly over suitable pulleys 14 suspended from the central portion of the silo roof in a known manner and then outwardly of the silo wall 7 over other pulleys 15 to the drum of a suitable windlass 16 positioned near the ground level for ready access. Mounted upon the frame 12 for vertical movement therewith is an endless conveyor 17 having its frame 18 preferably supported at one end on a horizontal pivot shaft 19 journalled in depending brackets 20 secured to the frame 12 centrally of the silo, the conveyor frame 18 extending therefrom radially outward through the discharge opening 8 in the silo wall. Rotatably supported beneath the main frame 12 is a polygonal scraper carrying frame 22 having an annular pin gear 23 rigidly secured thereto and also being provided with an annular series of spaced rigid radiating guide arms 24 each provided with a wall engaging roller 25 as will hereinafter more fully appear, the frame 22 also being provided with a lower spirally curved scraper blade 26 secured thereto in any suitable manner as by means of depending brackets 27. To drive the endless conveyor 17 and the rotatable scraper frame 22 and its associated parts, a suitable motor 28 is provided, the motor being rigidly mounted above the unit to a table or other suitable support 29 carried by the main frame 12 and having its drive shaft 30 drivingly connected to the conveyor 17 and pin gear 23 as will now be more fully described.

As indicated, the motor 28 is suitably mounted on a supporting table 29 which in turn is rigidly secured to the rectangular main frame 12 non-rotatably suspended for vertical movement within the silo 6 by means of cables 13, the drive shaft 30 of the motor 28 being connected by a belt or chain 32 with a relatively large sheave or sprocket wheel 33 journalled on the table 29 so as to drive the wheel 33 in a known manner. In turn, the shaft 34 of the wheel 33 carries a spocket 35 drivingly connected, as by means of a chain 36 and sprocket 37, to a drive shaft 38 rotatably mounted on the main frame 12 and having a gear 39 keyed thereto and meshing with the pin gear 23 to rotate the pin gear 23, frame 22 and scraper blade 26 upon operation of the motor. Also keyed to the drive shaft 38 is another sprocket or gear 40 drivingly connected to the shaft 19 of the conveyor 17 through a chain 42 and sprocket 43 as shown or through suitable meshing gears, the inner conveyor sprocket 44 thus also being driven upon operation of the motor to drive the endless belt or chain 45 of the conveyor 17 about the outer sprocket 46 thereof.

Accordingly, when the unloading unit is positioned within the silo 6 and is lowered by means of the cables 13 so that the scraper blade 26 is resting on the top surface of the silage 10 and with the end of the conveyor 17 projecting outwardly through the discharge opening 8 in the silo wall, the motor 28 need only be turned on to initiate the unloading operation. With the motor operating, the wheel 33 is driven through the belt 32 with the drive shaft 38 in turn being driven in an obvious manner through the sprockets 35, 37 and chain 36, thereby rotating the gear 39 and driving the pin gear 23 about its vertical axis, the pin gear 23 being supported and guided in its rotational movement by sets of spaced guide wheels 47, 48 carried by laterally extending arms 49, 50 respectively rigidly secured to the non-rotatable main frame 12. As the pin gear 23 is thus rotated relative to the frame 12, it carries with it the generally square frame 22 and the scraper blade 26 which, by reason of its spiral formation, conveys loose silage from across the entire surface to the central portion of the silo in the vicinity of the feed end of the endless conveyor 17, the scraper blade 26 also being provided with a spaced series of pointed outwardly and downwardly directed prongs or teeth 52 acting as a rake to loosen the silage as the blade 26 is thus rotated. During rotation of the frame 22 and blade 26, the entire unit is kept centered within the silo 6 by the radiating arms 24 whose guide wheels 25 ride along the inner surface of the wall 7 as the arms 24 are rotated with the frame 22; and in order that the wheels 25 are maintained in contact with the wall 7 while following any possible irregularities therein, certain of the guide wheels 25 are preferably specially resiliently mounted on their respective rigid arms 24 in any suitable manner as by means of longitudinally reciprocable spindles or rods 53 maintained under constant tension by springs 54 or the like. Simultaneously with the rotation of the pin gear 23, frame 22 and scraper 26, the inner drive gear or sprocket 44 of the conveyor 17 is driven through the sprocket 43, chain 42 and sprocket 40 in an obvious manner, with the endless conveyor chain 45 thus being driven about the sprockets 44, 46 to thereby move the successive flights or pusher plates 55 from the center of the silo through the trough or discharge chute 56 to the discharge end thereof and thereby convey the silage through the opening 8 to the exterior. As the supply of silage 10 within the silo 6 is diminished, the silo unloading unit may be lowered as required by means of the cables 13, with the panels 9 likewise being removed as necessary.

From the foregoing detailed description, it is believed apparent that we have provided an improved silo unloader which is extremely simple, compact and durable in construction as well as highly efficient and practical in use. The various parts may be economically constructed of available materials such as sheet stock and angle irons, and these parts may obviously be readily assembled in situ with the aid of ordinary tools by relatively unskilled labor. Furthermore, the improved device is of unitary construction and comprises relatively few parts, all of which are readily accessible for inspection and repair. The motor 28 and all moving parts of the assemblage are moreover conveniently and safely positioned above the silage being worked on so as to be especially accessible and also in a position of maximum protection from dirt, dust and possible damage, and a suitable control switch for the motor may be connected thereto and positioned in an accessible location exteriorly of the silo 6 and preferably near the winch or windlass 16. The drive shaft 38 may be journalled on the frame 12 in any suitable manner and may be braced by means of laterally extending rigid arms 57 or the like; and the discharge chute or trough 56 of the conveyor may be secured in position by means of straps 58 carried by the conveyor frame members 18. By means of the scraper blade 26, the silage is uniformly moved from across the surface to the center portion from which point it is continuously removed by the lower flight of the endless conveyor 17 to the exterior of the silo in an obvious manner. The improved devices have proven highly successful and efficient in actual use and may, of course, be readily adapted for silos of various sizes.

It should be understood that it is not desired or intended to limit this invention to the exact details of construction or to precise mode of use herein shown and described, since various modifications within the scope of the appended claims may occur to persons skilled in the art to which this invention pertains.

We claim:
1. A silo unloader adapted for installation within a silo above the surface of the silage therein and comprising, a vertically movable non-rotatable main frame, a motor rigidly mounted above said main frame for vertical movement therewith, a secondary frame supported for rotation relative to and below said main frame, an annular pin gear rigidly secured to said secondary frame, means depending from said secondary frame and rotatable therewith for loosening the surface silage and conveying the loosened silage toward the center of the silo, a conveyor having its receiving end positioned below said main frame approximately centrally of the silo and its delivery end extending exteriorly thereof, and means operatively connecting said motor through a common drive shaft to said pin gear and to said conveyor for driving said secondary frame and said conveyor.

2. A silo unloader adapted for installation within a silo above the surface of the silage therein and comprising, a vertically movable non-rotatable main frame, a motor rigidly mounted entirely above said main frame for vertical movement therewith, a secondary frame supported for rotation relative to and below said main frame, an annular pin gear rigidly secured to said secondary frame, means carried by said main frame and cooperating with said pin gear for guiding the same in its rotational movement, means depending from said secondary frame and rotatable therewith for loosening the surface silage and conveying the loosened silage toward the center of the silo, a conveyor having its receiving end positioned below said main frame approximately centrally of the silo and its delivery end extending exteriorly thereof, a common drive shaft having a direct drive engagement with said pin gear and said conveyor, and means operatively connecting said motor to said drive shaft for simultaneously driving said secondary frame through its pin gear and said conveyor.

3. A silo unloader adapted for installation within a silo above the surface of the silage therein and comprising, a vertically movable non-rotatable main frame, a motor rigidly mounted above said main frame for vertical movement therewith, a secondary frame supported for rotation relative to and below said main frame, an annular pin gear rigidly secured to said secondary frame, an annular series of spaced guide rollers carried by said main frame and peripherally coacting with said pin gear for guiding the same in its rotational movement, means depending from said secondary frame and rotatable therewith for loosening the surface silage and conveying the loosened silage toward the center of the silo, a conveyor having its receiving end positioned below said main frame approximately centrally of the silo and its delivery end extending exteriorly thereof, and means operatively connecting said motor to said secondary frame through its pin gear and to said conveyor for simultaneously driving the same.

4. A silo unloader adapted for installation within a silo above the surface of the silage therein and comprising, a vertically movable non-rotatable main frame, a motor rigidly mounted above said main frame for vertical movement therewith, a secondary frame supported for rotation relative to and entirely below said main frame and having a series of radiating arms secured thereto, each of said arms having a silo wall engaging wheel journalled thereon, means for constantly resiliently urging at least some of said wheels toward the silo wall, means depending from said secondary frame and rotatable therewith for loosening the surface silage and conveying the loosened silage toward the center of the silo, a conveyor having its receiving end positioned below said main frame approximately centrally of the silo and its delivery end extending exteriorly thereof, a common drive shaft for said secondary frame and said conveyor, and means operatively connecting said motor to said drive shaft for simultaneously driving said secondary frame and said conveyor.

References Cited in the file of this patent
UNITED STATES PATENTS

| | | |
|---|---|---|
| 1,233,308 | Burgess | July 17, 1917 |
| 2,518,601 | Cordis | Aug. 15, 1950 |